United States Patent
Click, Jr. et al.

(10) Patent No.: US 6,363,522 B1
(45) Date of Patent: Mar. 26, 2002

(54) METHOD AND APPARATUS FOR HANDLING EXCEPTIONS AS NORMAL CONTROL FLOW

(75) Inventors: Clifford N. Click, Jr.; Christopher A. Vick, both of San Jose; Michael H. Paleczny, Sunnyvale, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/298,354

(22) Filed: Apr. 23, 1999

(51) Int. Cl.[7] .................................................. G06F 9/45

(52) U.S. Cl. ........................................................... 717/9

(58) Field of Search .................... 717/9, 10, 5; 709/100; 345/804

(56) References Cited

U.S. PATENT DOCUMENTS

| | | | | |
|---|---|---|---|---|
| 5,493,675 A | * | 2/1996 | Faiman, Jr. et al. | 717/9 |
| 5,613,117 A | * | 3/1997 | Davidson et al. | 717/8 |
| 5,778,233 A | * | 7/1998 | Besaw et al. | 717/9 |
| 5,836,014 A | * | 11/1998 | Faiman, Jr. | 717/7 |
| 5,875,335 A | * | 2/1999 | Beard | 717/5 |
| 5,905,895 A | * | 5/1999 | Halter | 717/9 |
| 6,075,940 A | * | 6/2000 | Gosling | 717/4 |
| 6,113,651 A | * | 9/2000 | Sakai et al. | 717/6 |
| 6,128,774 A | * | 10/2000 | Necula et al. | 717/5 |
| 6,131,187 A | * | 10/2000 | Chow et al. | 717/5 |
| 6,185,668 B1 | * | 2/2001 | Arya | 712/23 |
| 6,192,517 B1 | * | 2/2001 | Agesen et al. | 717/9 |
| 6,202,145 B1 | * | 3/2001 | Barnes et al. | 712/244 |
| 6,202,204 B1 | * | 3/2001 | Wu et al. | 717/9 |
| 6,219,832 B1 | * | 4/2001 | Buzbee | 717/5 |

OTHER PUBLICATIONS

Zilles et al., "The use of multitherading for exception handling", IEEE, pp 219–229, 1999.*
Ramsey et al, "A single intermediate language that supports multiple implementations of exceptions", ACM PLDI pp 285–298, Feb. 2000.*
Lee et al, "Efficient Java exception handling in just in time compilation", ACM, Java 2000, pp 1–8, Mar. 2000.*
Choi et al, "Efficient and precise modeling of exceptions for the analysis of Java program", ACM Paste, pp 21–31, Feb. 1999.*
Ishizaki et al, "Design implemenation and evaluation of optimizations ina Just in time Compiler", ACM Java, pp 119128, May 1999.*
Burke et al, "The Jalapeno dynamic optimizing compiler for Java", ACM Java, pp 129–141, May 1999.*

* cited by examiner

Primary Examiner—Kakali Chaki
Assistant Examiner—Anil Khatri
(74) Attorney, Agent, or Firm—Beyer Weaver & Thomas LLP

(57) ABSTRACT

Methods and apparatus for handling exceptions as a part of normal program control flow are disclosed. According to one aspect of the present invention, a method for processing an exception in an object-based system includes obtaining source code that includes a code segment which is arranged to explicitly specify instructions pertaining to an exception check. The method also includes creating a final internal representation of the source code at least in part by removing a call associated with the exception check, and generating machine code associated with the final internal representation. In one embodiment, the method further includes executing the machine code. In another embodiment, creating the final internal representation of the source code includes processing the exception check as a part of a control flow associated with the source code.

18 Claims, 7 Drawing Sheets

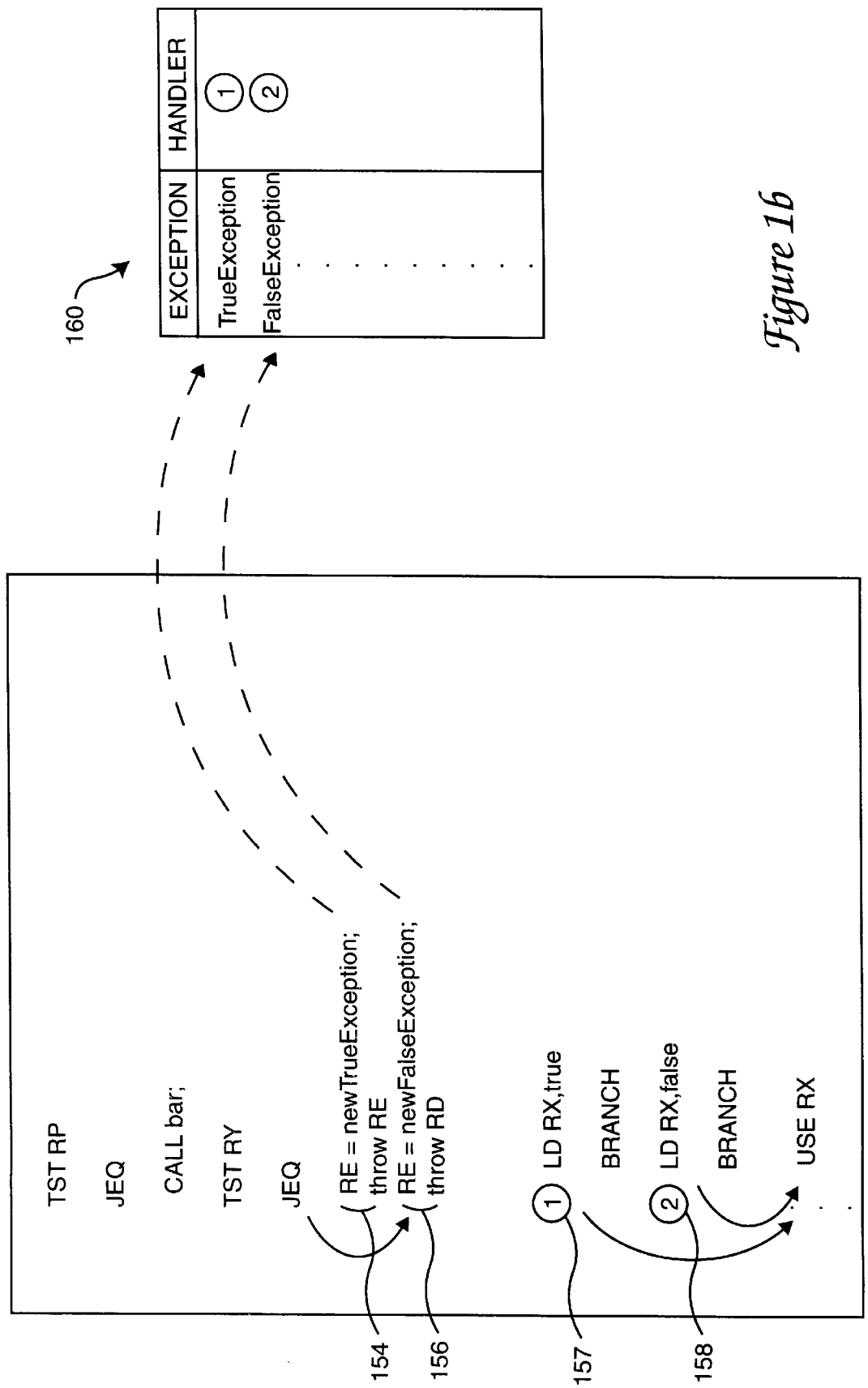

METHOD AND APPARATUS FOR HANDLING EXCEPTIONS AS NORMAL CONTROL FLOW

BACKGROUND OF THE INVENTION

1. Field of Invention

The present invention relates generally to methods and apparatus for improving the performance of software applications. More particularly, the present invention relates to methods and apparatus for processing exceptions as a part of the normal control flow of a computer program.

2. Description of the Related Art

In an effort to increase the efficiency associated with the execution of computer programs, many computer programs are "optimized." Optimizing a computer program generally serves to eliminate portions of computer code which are essentially unused. In addition, optimizing a computer program may restructure computational operations to allow overall computations to be performed more efficiently, thereby consuming fewer computer resources.

An optimizer is arranged to effectively transform a computer program, e.g., a computer program written in a programming language such as C++, FORTRAN or Java bytecodes into a faster program. The faster, or optimized, program generally includes substantially all the same, observable behaviors as the original, or preconverted, computer program. Specifically, the optimized program includes the same mathematical behavior has its associated original program. However, the optimized program generally recreates the same mathematical behavior with fewer computations.

Optimizers are generally arranged to handle exceptions associated with a computer program. As will be appreciated by those skilled in the art, an exception is typically an event or a condition that requires processing outside of the normal control flow. As the name "exception" implies, it is intended to signal rare, or exceptional, events. While it is possible for programs to use exceptions in their normal handling, the handling of exceptions is usually associated with rare error conditions. Exceptions associated with computer programs typically either involve array range checks or invalid pointer accesses.

A range check is implemented in a computer program to ascertain whether a reference to an array stays within the bounds of the array. Specialized code may be included in a computer program to handle a range check. When a reference to an array does not stay within the bounds of the array, an exception may be raised to indicate that the reference is out of the bounds of the array.

An invalid pointer reference generally involves using a pointer that does not point to any valid memory location. In some programming languages, e.g., the Java™ programming language developed by Sun Microsystems, Inc. of Palo Alto, California, a pointer either points to a valid memory location or is the null value. When a null pointer is referenced, an exception is thrown. In some cases, redundant tests for null pointers, i.e., "null checks," may occur. When a first test indicates that a pointer is not the null value, a second test that is arranged to test whether a pointer is the null value is a redundant test. As will be appreciated by those skilled in the art, a test for a null pointer is implicitly performed when an attempt is made to load the contents associated with a pointer.

FIG. 1a is a diagrammatic representation of a source code which includes commands to load pointers and, hence, implicitly includes null checks. Source code 102 includes commands, or instructions, to load contents associated with pointers into registers. By way of example, a command 103 is a command to load the contents of a field "A" through pointer "ptrl." When such a command occurs, the central processing unit [CPU] hardware makes a check to determine if the pointer is a valid pointer. For the Java™ programming language, the only invalid pointer is the null pointer. Hence, the check by the CPU hardware check is essentially a check for the null pointer. A command 104 is also a command to load through pointer "ptrl." Although a determination has generally already made regarding whether pointer "ptrl" is null with respect to command 103, an essentially redundant check regarding whether pointer "ptrl" is generally made with respect to command 104. Source code 102 is provided to an optimizer 106 which is arranged to optimize source code 102. Once an optimization process is completed, then machine code 110 associated with source code 102 is created.

When an exception is thrown in response to the identification of a null pointer, a table is typically accessed to process the exception. Such a table is often a look-up table that maps a type of exception to a suitable code segment for handling the exception. FIG. 1b is a diagrammatic representation of code which handles exceptions and accesses a look-up table to process the exceptions. A code representation 152 includes calls arranged to throw different types of exceptions. A call 154 to a function that throws a "TrueException" results in a look-up table 160 being accessed. Specifically, the "TrueException" is used as an index into look-up table 160 such that an appropriate segment of code associated with the throwing of a "TrueException." As shown, a segment of code 157 is eventually accessed by call 154. Similarly, a call 156 to a function that throws a "FalseException" maps to a segment of code 158 through look-up table 160.

In general, each time an exception is thrown, e.g., each time a call is made to a function that throws a "TrueException," storage is allocated to an exception object. That is, an exception object is created for each exception that is thrown. Such exception objects are often never used, as will be appreciated by those skilled in the art. However, exception objects are considered to be in use and, hence, are not eliminated by an optimizer during an optimization process. Therefore, the time to initialize exception objects and the memory space occupied by exception objects is effectively wasted as the memory space may not be reallocated for alternative uses.

In a programming language such as the Java™ programming language, precise exception handling is typically required. Precise exception handling generally requires that exception checks be neither reordered nor removed. As such, redundant code is often associated with the handling of an exception such as a null pointer exception, as previously mentioned.

Although specific exception handling code may be relatively effective in handling exceptions, since the code that handles exceptions is often redundant, the optimization of source code which includes exception handling code may not be complete. In other words, an optimization process may not produce a program that is optimized as much as possible. When a program is not completely optimized, the program may not execute efficiently. Further, as previously mentioned, each time an exception is thrown, storage is allocated to an exception object. Since exception objects are generally not used, redundant exception objects created from redundant exception code increase the amount of wasted memory space associated with a computer system.

In order to further optimize programs with precise exceptions, optimizers typically include special optimization techniques to handle the exceptions. The presence of these special techniques requires custom code to be added to the optimizer. This custom code is a often a source of subtle bugs. Further, such custom code is often not well integrated into the rest of the optimizer, and will not be able to remove some exception checks that could be removed if the full power of the optimizer could be brought to bear.

Therefore, what is desired is an efficient method for handling exceptions. Specifically, what is needed is a method and an apparatus for substantially eliminating redundant exception checks by enabling an optimizer to handle exceptions as part of normal program control flow.

SUMMARY OF THE INVENTION

The present invention relates to handling exceptions as a part of normal program control flow. According to one aspect of the present invention, a method for processing an exception in an object-based system includes obtaining source code that includes a code segment which is arranged to explicitly specify instructions pertaining to an exception check. The method also includes creating a final internal representation of the source code at least in part by removing a call associated with the exception check, and generating machine code associated with the final internal representation. In one embodiment, the method further includes executing the machine code.

In another embodiment, creating the final internal representation of the source code includes processing the exception check as a part of a control flow associated with the source code. In such an embodiment, creating the final internal representation of the source code further includes optimizing the processing of the exception check.

By integrating the handling of exceptions into normal program control flow, the efficiency of handling exceptions may be increased. For instance, exceptions which are handled as part of normal program control flow may have redundant checks eliminated by the mechanism which removes redundant checks in normal control flow. Additionally, exception objects which are never used may be eliminated when exceptions are handled as part of normal program control flow, i.e., the optimizer already removes unused code and with this invention may also remove code associated with exceptions, thereby freeing resources associated with the exception objects.

According to another aspect of the present invention, a method for creating a representation of source code with code portions associated with exceptions includes first obtaining the source code. The source code includes a first code portion that is nested within a second code portion. A determination is made as to whether the first code portion is redundant with respect to the second code portion, and a transformation is performed to change the source code into an internal representation. Such a transformation of the source code into an internal representation includes eliminating the first code portion from the source code when it is determined that the first code portion is redundant with respect to the second code portion. In one embodiment, the internal representation is further transformed into machine code.

In another embodiment, each of the first code portion and the second code portion includes a determination of whether to throw a particular exception. In such an embodiment, determining whether the first code portion is redundant with respect to the second code portion includes determining if the first code portion is arranged to be reached by a program control flow associated with the source code when the particular exception is not to be thrown.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 1b is a diagrammatic representation of machine code that handles exceptions as part of its normal execution.

DETAILED DESCRIPTION OF THE EMBODIMENTS

Precise exception handling is often required in a programming language such as the Java™ programming language developed by Sun Microsystems, Inc. of Palo Alto, California. Precise exception handling generally requires that exception checks not be reordered or removed, unless it may be proven that no exception may occur in a particular area, and may require specific exception handling code to be implemented. For each exception, code that is arranged to handle the exception may be required. As such, redundant code is often associated with the handling of an exception such as a null pointer exception. For example, redundant code is present in a test of whether a particular pointer is null if that test occurs after it has already been determined that the particular pointer is not null. As will be understood by those skilled in the art, a null pointer is generally a pointer that does not reference memory but, instead, contains a null value. When a null pointer is referenced, an exception is thrown.

Processing redundant exception handling code to determine whether a pointer is null is both unnecessary and inefficient when it has already been determined that a particular pointer is not a null pointer. While specific exception handling code is relatively effective in handling exceptions, the optimization of source code which includes redundant exception handling code is generally not considered to be complete. That is, such source code may be further optimized. When a program is not completely optimized, the program may execute somewhat inefficiently.

By including exception processing instructions explicitly within the normal control flow of a computer program, the computer program may be transformed by an optimizer to remove instructions associated with the processing of redundant exceptions. In other words, explicitly coding exception processing instructions into a computer program enables that computer program to be optimized to remove redundant exception handling code. Further, integrating exception handling into the normal flow of a computer program serves to enable objects created when exceptions are thrown to be removed during an optimization process. Hence, machine code generated from a program with integrated exception handling typically execute more efficiently than machine code generated from a program with specific exception handling code.

Figure 1A:
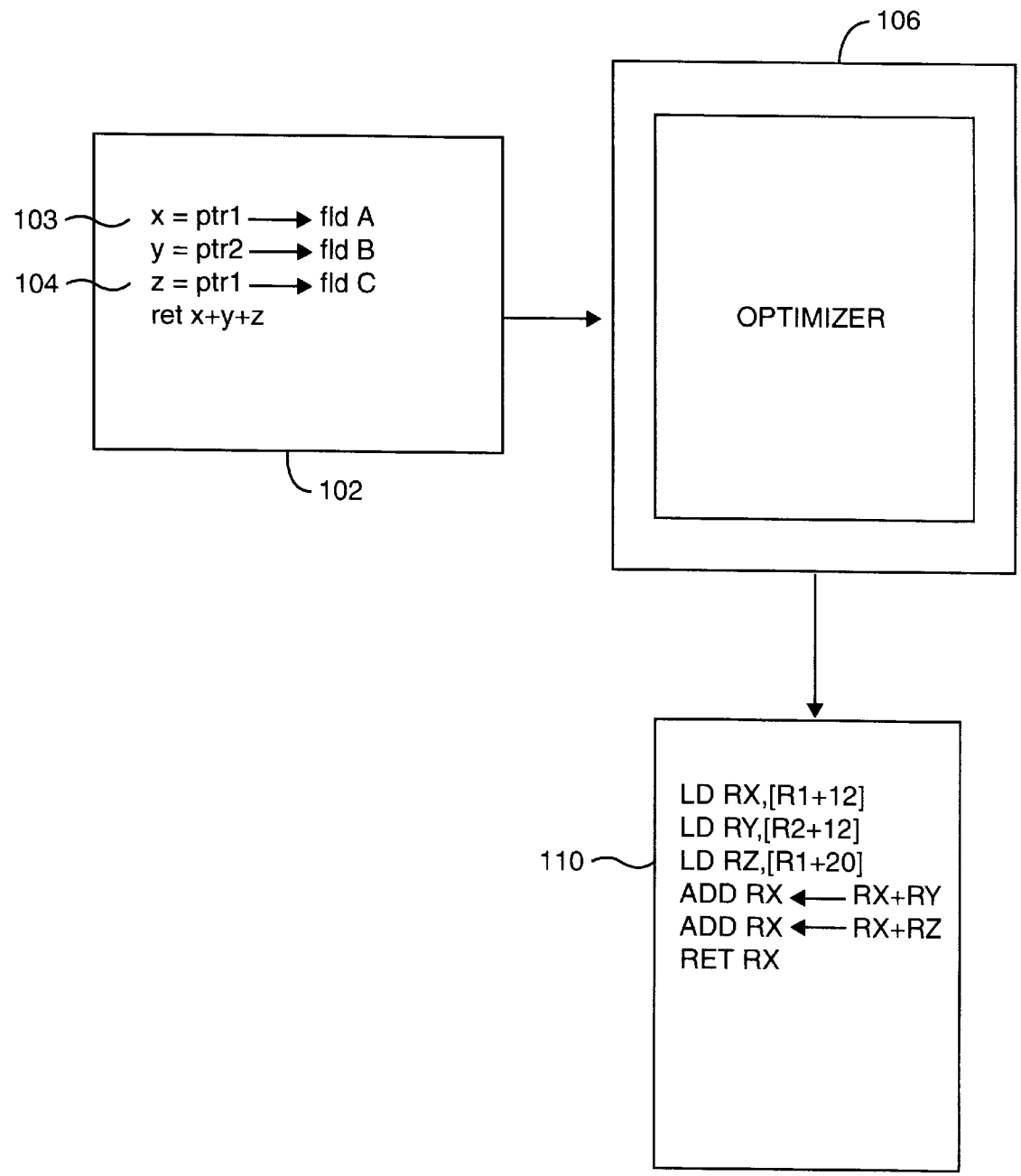
FIG. 1a is a diagrammatic representation of a source code which implicitly includes null checks and machine code, which is generated by an optimizer, that is associated with the source code.
Figure 2:
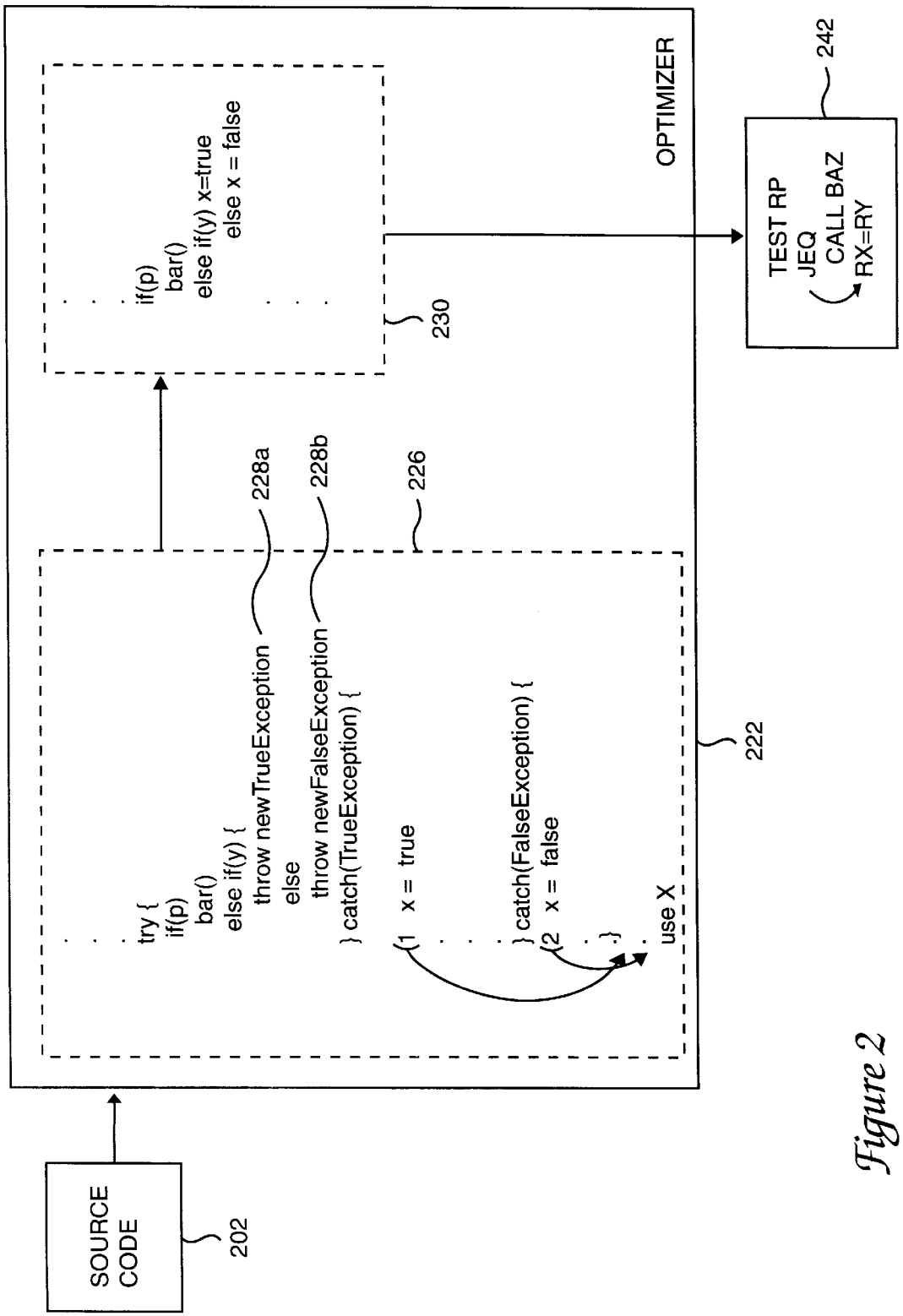
FIG. 2 is a diagrammatic representation of the action of an optimizer that integrates exception handling into normal program control flow in accordance with an embodiment of the present invention, as the optimizer operates on a program which uses exceptions.

FIG. 2 is a diagrammatic representation of an optimizer which integrates exception handling into normal program control flow in accordance with an embodiment of the present invention. Source code 202 which explicitly specifies exception flow, e.g., program flow associated with processing an exception, is provided as an input to an optimizer 222. Optimizer 222 is generally arranged to transform source code 202 into machine code 242 that is the mathematical computational equivalent of source code 202.

In the described embodiment, optimizer 222 creates an intermediate internal representation 226 of source code 202 based upon a language such as the Java™ programming language. Intermediate internal representation 226 may be considered to be a "literal" representation of source code 202 in that the program flow associated with intermediate internal representation 226 is substantially unoptimized. Intermediate internal representation 226 includes calls 228 to functions which are arranged to throw exceptions. Such functions may access a look-up table that maps a particular exception to a segment of code that is associated with the particular exception. Such look-up table mappings may be converted into traditional "goto" commands, in one embodiment.

The optimizer is arranged such that it may remove extra "goto" commands as part of its normal processing. In addition, optimizer 222 optimizes intermediate internal representation 226 such that unused, e.g., dead, code may be excluded from final internal representation 230. Final internal representation 230 is used by optimizer 222 to create machine code 242. As shown, calls 228 which are present in intermediate internal representation 226 may be eliminated from final internal representation 230, while still enabling final internal representation 230 to be the computational equivalent of intermediate internal representation 226. In other words, final internal representation 230 is effectively a simplification of intermediate internal representation 226. By eliminating calls 228 to functions which throw exceptions, unused exception objects that are created in response to thrown exceptions may be substantially eliminated.

Figure 3:
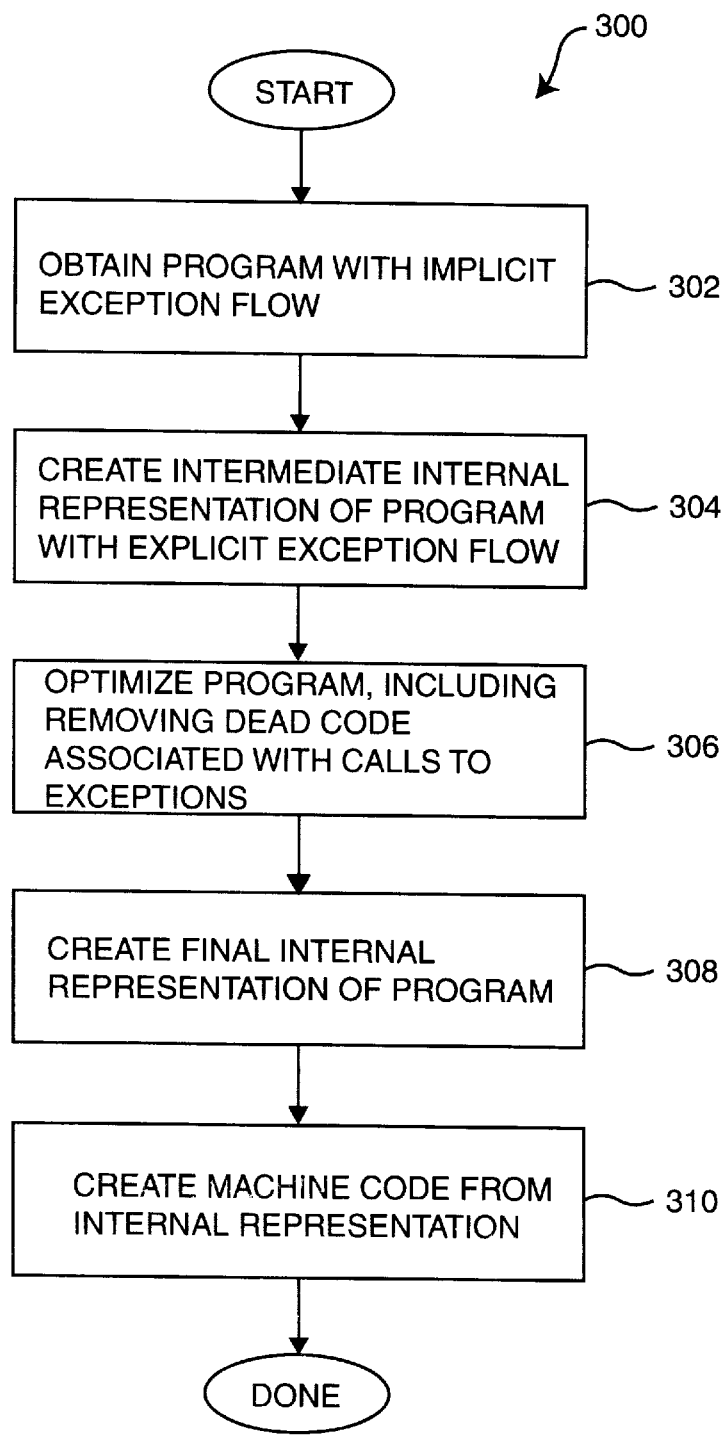
FIG. 3 is a process flow diagram which illustrates the steps associated with optimizing source code with explicit exception flow in accordance with an embodiment of the present invention.

With reference to FIG. 3, the steps associated with a process of creating machine code in which exception handling is integrated into normal control flow will be described in accordance with an embodiment of the present invention. A process 300 of creating machine code begins at step 302 in which a program with implicit exception flow is obtained by an optimizer. An example of a program with implicit exception flow will be described below with respect to FIG. 4.

After an optimizer obtains the program, then an intermediate internal representation of the program is created in step 304. In general, the intermediate internal representation of the program has all implicit exception flow made explicit and includes explicit exception checks. Additionally, the intermediate internal representation includes calls to exception handlers. In step 306, the intermediate internal representation is optimized. During the optimization process, the optimizer removes substantially all redundant exceptions checks and dead code associated with calls to exceptions, in addition to other optimizations. That is, the optimizer optimizes the intermediate internal representation by removing unused code. Other optimizations include, but are not limited to, performing table lookups associated with exception throws, and converting throw instructions into "goto" instructions.

From step 306, process flow moves to step 308 where a final internal representation of the program is created from the intermediate internal representation. As will be appreciated by those skilled in the art, the final internal representation is generated when unused code, or dead code, is removed from the corresponding intermediate internal representation. The final internal representation integrates exception handling into normal control flow, as previously discussed with reference to FIG. 2. After the final internal representation of the program is created in step 308, then the optimizer creates machine code from the final internal representation. Once the machine code is produced, the process of creating machine code that integrates exception handling into normal control flow is created.

Figure 4:
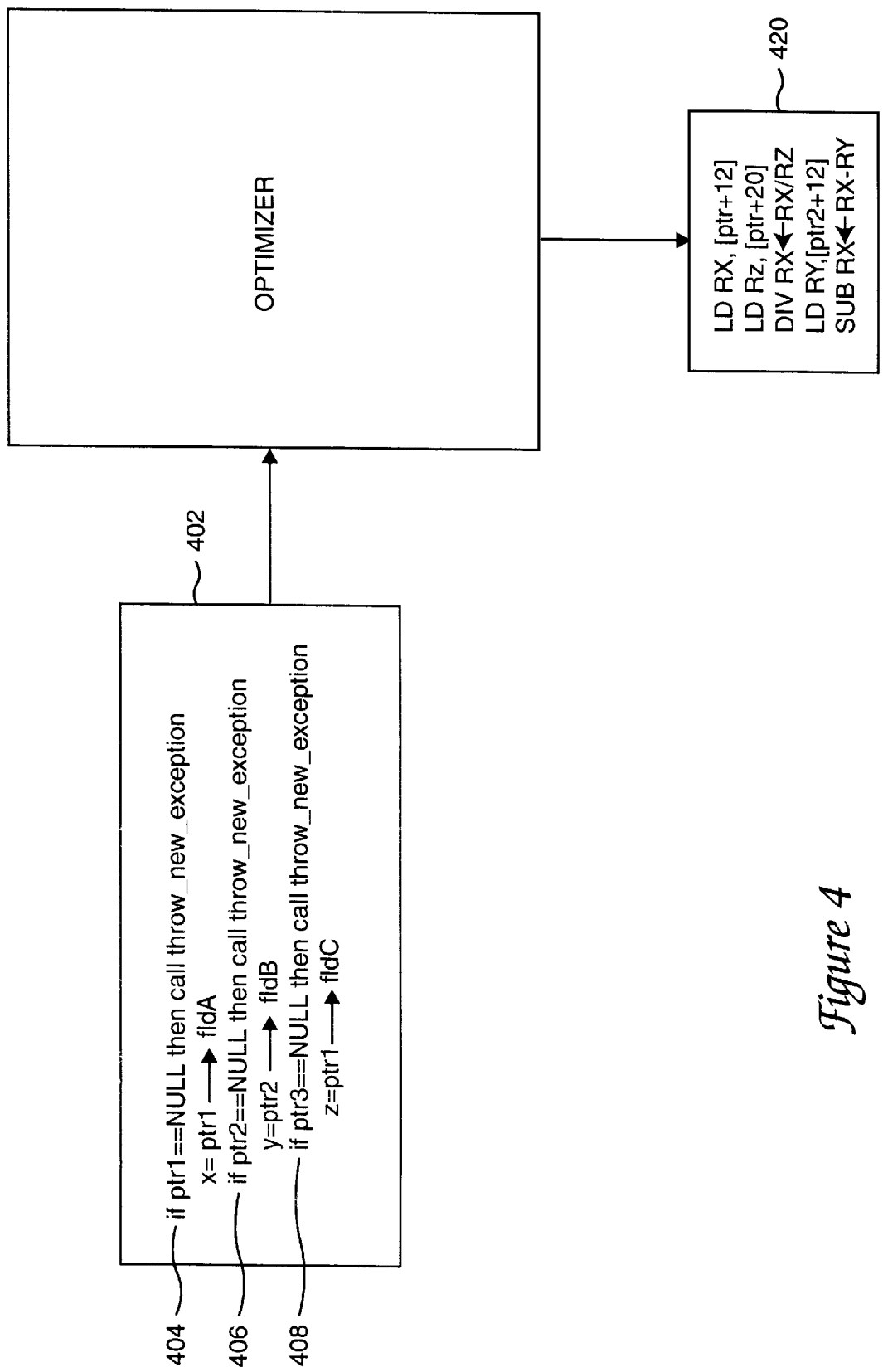
FIG. 4 is a diagrammatic representation of a computer program with explicit exception flow that has been processed by an optimizer in accordance with an embodiment of the present invention.

As mentioned above, an optimizer that is arranged to optimize a computer program with implicit exception flow allows redundant exception checks to be eliminated. FIG. 4 is a diagrammatic representation of a computer program with explicit exception flow that is processed by an optimizer to remove redundant exceptions in accordance with an embodiment of the present invention. An optimizer 410 is generally arranged to eliminate sections of unused code from source code 402 in order to optimize the performance associated with machine code 420, i.e., machine code generated by optimizer 410. In addition, optimizer 410 typically checks computations performed within source code 402, and removes computations which it proves as being unnecessary, e.g., redundant.

Source code 402, which explicitly specifies exception flow, includes an instruction 404 to throw an exception when a pointer "ptrl" is found to be a null pointer. When pointer "ptrl" is determined not to be a null pointer, then additional instructions 406, 408 are processed as a part of the normal control flow associated with source code 402. Instruction 408 is a redundant test of whether pointer "ptrl" is a null pointer, as instruction 408 may only be reached in normal control flow when instruction 404 results in a determination that pointer "ptrl" is not a null pointer. Optimizer 410 is arranged to determine that instruction 408 is unnecessary in light of instruction 404. Once optimizer 410 determines that instruction 408 is a redundant instruction, optimizer 410 may eliminate instruction 408 and create machine code 420. In machine code 420, the loading of register RZ is hoisted above the loading of register RY, thereby allowing the relatively slow divide (DIV) instruction to begin execution sooner. This allows the loading of RY and the divide instruction to overlap in time, creating a faster program. As discussed above with respect to FIG. 3, in one embodiment, optimizer 410 also integrates the processing of exceptions into normal control flow of an internal representation (not shown) and, hence, machine code 420.

Figure 5:
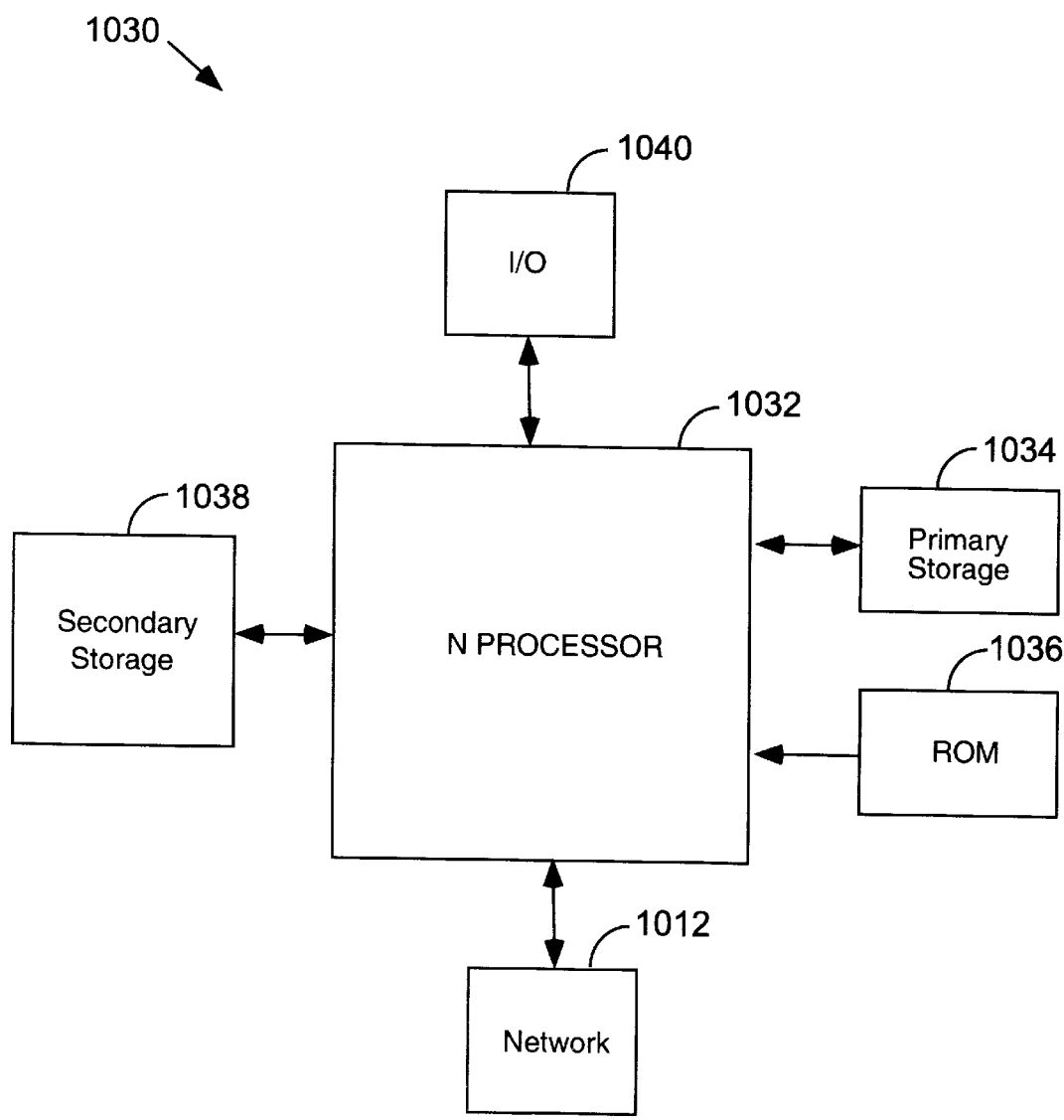
FIG. 5 is a diagrammatic representation of a general purpose computer system suitable for implementing the present invention.

FIG. 5 illustrates a typical, general purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM).

Computer system 1030 or, more specifically, CPU 1032, may be arranged to support a virtual machine, as will be appreciated by those skilled in the art. One example of a virtual machine that is supported on computer system 1030 will be described below with reference to FIG. 6. As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CDROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 6:
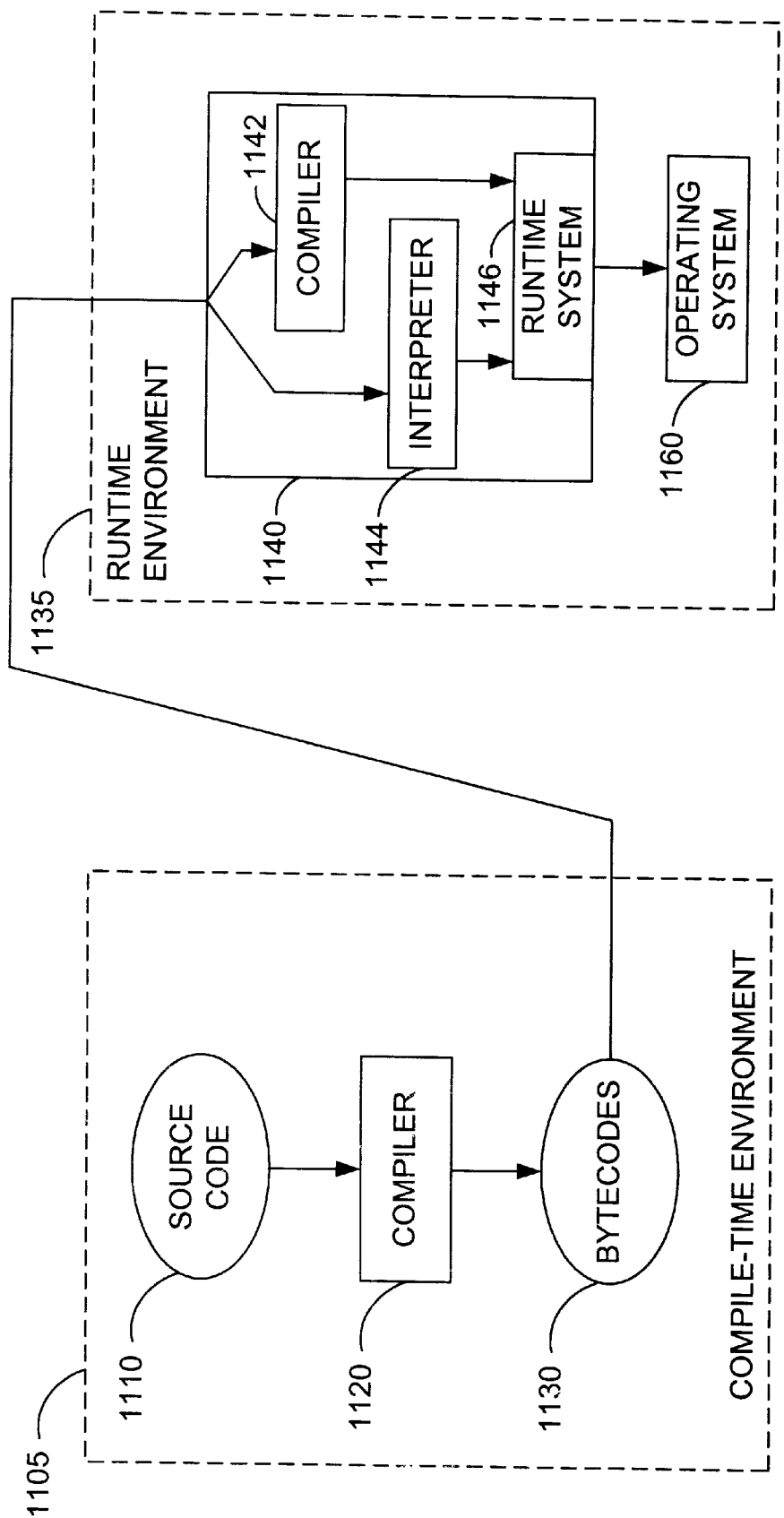
FIG. 6 is a diagrammatic representation of a virtual machine which is supported by the computer system of FIG. 5, and is suitable for implementing the present invention.

As previously mentioned, a virtual machine may execute on computer system 1030. FIG. 6 is a diagrammatic representation of a virtual machine which is supported by computer system 1030 of FIG. 5, and is suitable for implementing the present invention. When a computer program, e.g., a computer program written in the Java™ programming language developed by Sun Microsystems of Palo Alto, California, is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 5, or stored on a storage device such as primary storage 1034 of FIG. 5. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 5. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps involved with creating machine code from source code that specifies explicit exception flow may be reordered, removed or added. In general, steps involved with the methods of the present invention may be reordered, removed, or added without departing from the spirit or the scope of the present invention.

While exception handling as a part of the normal control flow of a computer program has generally been described as being associated with a Java™ environment, it should be appreciated that such exception handling may be implemented in substantially any suitable environment. By way of example, in lieu of an environment associated with a Java™ virtual machine, environments associated with other virtual machine may be implemented. Therefore, the present examples are to be considered as illustrative and not restrictive, and the invention is not to be limited to the details given herein, but may be modified within the scope of the appended claims.

What is claimed is:

1. A computer-implemented method for processing an exception in an object-based system, the computer-implemented method comprising:
   obtaining source code, the source code including a code segment that is arranged to explicitly specify instructions pertaining to an exception check;
   creating a final internal representation of the source code, wherein creating the final internal representation includes removing dead code associated with a call associated with the exception check; and
   generating machine code, wherein the machine code is generated using the final internal representation.

2. A computer-implemented method as recited in claim 1 further including executing the machine code.

3. A computer-implemented method as recited in claim 1 wherein creating the final internal representation of the source code includes processing the exception check as a part of a control flow, the control flow being associated with the source code.

4. A computer-implemented method as recited in claim 3 wherein creating the final internal representation of the source code further includes optimizing the processing of the exception check.

5. A computer-implemented method as recited in claim 1 further including writing the source code, wherein writing the source code includes writing the code segment that is arranged to explicitly specify the instructions pertaining to the exception check.

6. A computer-implemented method as recited in claim 1 wherein creating the final internal representation includes:
   calling a function associated with the exception check; and
   creating an object associated with the exception check in response to calling the function associated with the exception.

7. A computer-implemented method as recited in claim 6 wherein creating the final internal representation further includes destroying the object associated with the exception check.

8. A computer-implemented method as recited in claim 1 wherein the exception check is one of a null pointer check and a range check.

9. A computer system for processing an exception, the computer system comprising:
   a processor;
   a source code generator, the source code generator being arranged to generate a code segment that is arranged to explicitly specify instructions pertaining to an exception check;
   an optimizer, the optimizer being arranged to create a final internal representation of the source code at least partially by removing dead code associated with a call associated with the exception check; and
   a machine code generator, the machine code generator being arranged to generate machine code using the final internal representation.

10. A computer system according to claim 9 wherein the optimizer is further arranged to process the exception check as a part of a control flow, the control flow being associated with the source code.

11. A computer system according to claim 9 wherein the optimizer is further arranged to call a function associated with the exception check and to cause an object associated with the exception check to be created in response to the call to the function associated with the exception check.

12. A computer system according to claim 11 wherein the optimizer is still further arranged to destroy the object associated with the exception check.

13. A computer program product for processing an exception in an object-based system, the computer program product comprising:
   computer code for obtaining source code, the source code including a code segment that is arranged to explicitly specify instructions pertaining to an exception check;
   computer code for creating a final internal representation of the source code, wherein the computer code for creating the final internal representation includes computer code for removing dead code associated with a call associated with the exception check;
   computer code for generating machine code using the final internal representation; and
   a computer-readable medium that stores the computer codes.

14. A computer program product according to claim 13 wherein the computer-readable medium is one selected from the group consisting of a data signal embodied in a carrier wave, a CD-ROM, a hard disk, a floppy disk, a tape drive, and flash memory.

15. A computer-implemented method for creating a representation of source code, the source code including a plurality of code portions associated with exceptions, the computer-implemented method comprising:
   obtaining the source code including the plurality of code portions associated with exceptions, wherein a first code portion selected from the plurality of code portions is nested within a second code portion selected from the plurality of code portions;
   determining whether the first code portion is redundant with respect to the second code portion; and
   transforming the source code into an internal representation, wherein transforming the source code into an internal representation includes eliminating the first code portion from the source code when it is determined that the first code portion is redundant with respect to the second code portion.

16. A computer-implemented method as recited in claim 15 further including transforming the internal representation into machine code.

17. A computer-implemented method as recited in claim 15 wherein the first code portion and the second code portion each includes a determination of whether to throw a particular exception, and determining whether the first code portion is redundant with respect to the second code portion includes determining when the first code portion is arranged to be reached by a program control flow associated with the source code when the particular exception is not to be thrown.

18. A computer-implemented method as recited in claim 17 wherein when it is determined that the first code portion is arranged to be reached by the program control flow associated with the source code when the particular exception is not to be thrown, the first code portion is determined to be redundant with respect to the second code portion.

* * * * *